March 17, 1936. M. A. LAURET 2,034,144
SYSTEM FOR CHARGING INTERNAL COMBUSTION ENGINES
Filed Oct. 5, 1932 3 Sheets-Sheet 1
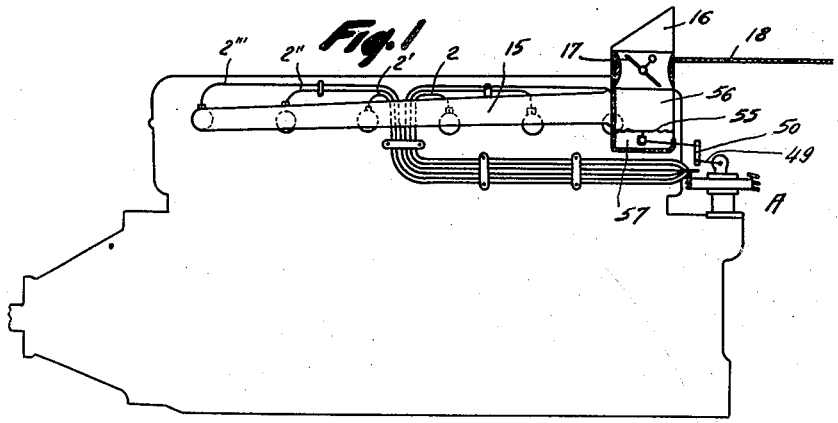
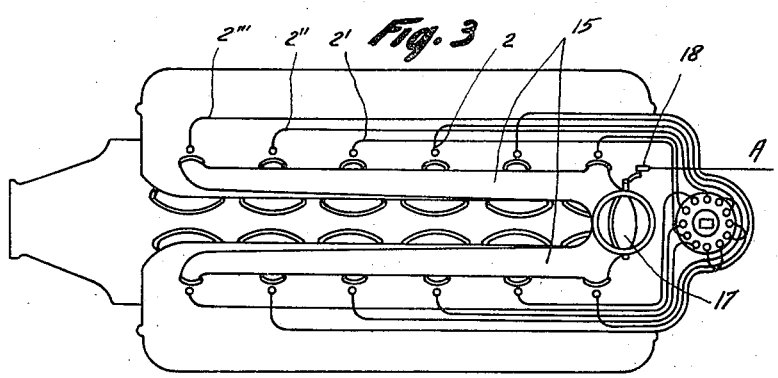
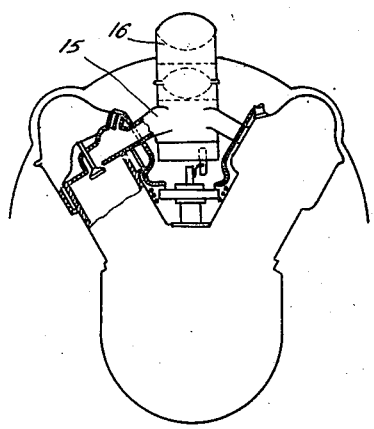
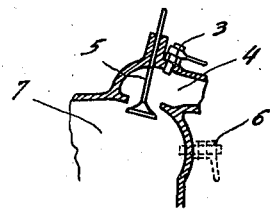
INVENTOR.
Marin André Lauret
Warren T. Hunt
ATTORNEY.

March 17, 1936. M. A. LAURET 2,034,144
SYSTEM FOR CHARGING INTERNAL COMBUSTION ENGINES
Filed Oct. 5, 1932 3 Sheets-Sheet 2
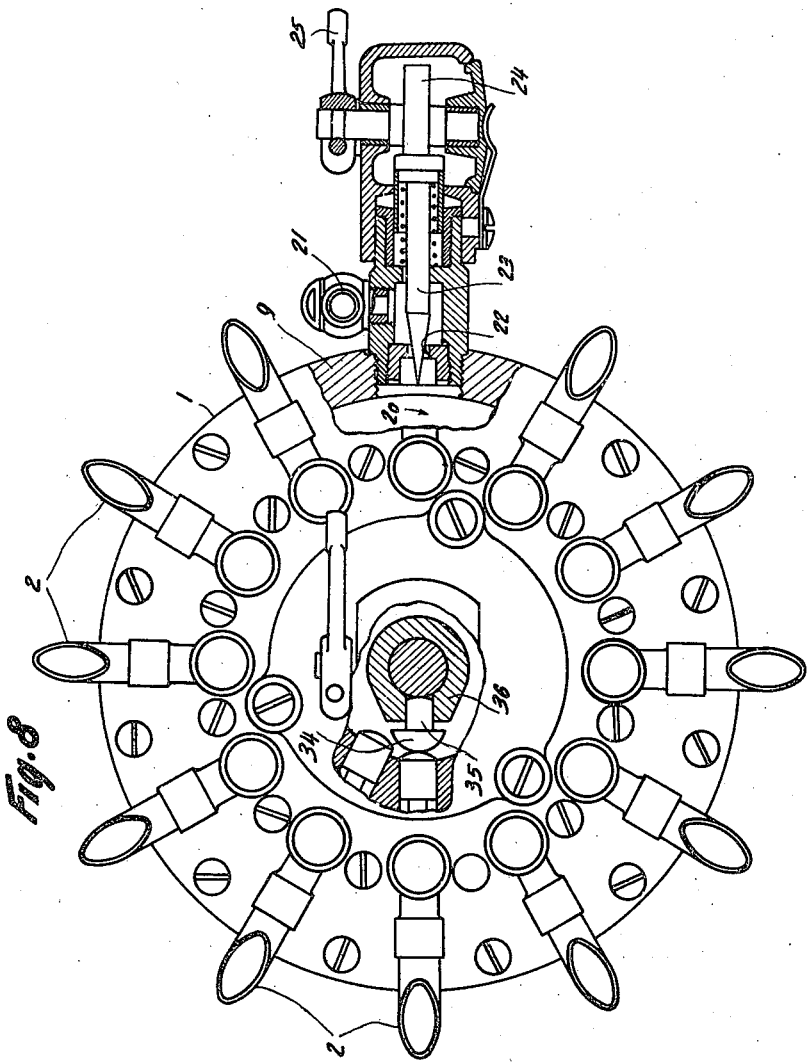
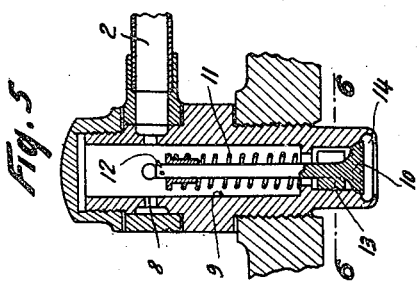
INVENTOR.
Marin André Lauret
Warren T. Hunt
ATTORNEY.

March 17, 1936. M. A. LAURET 2,034,144
SYSTEM FOR CHARGING INTERNAL COMBUSTION ENGINES
Filed Oct. 5, 1932 3 Sheets-Sheet 3
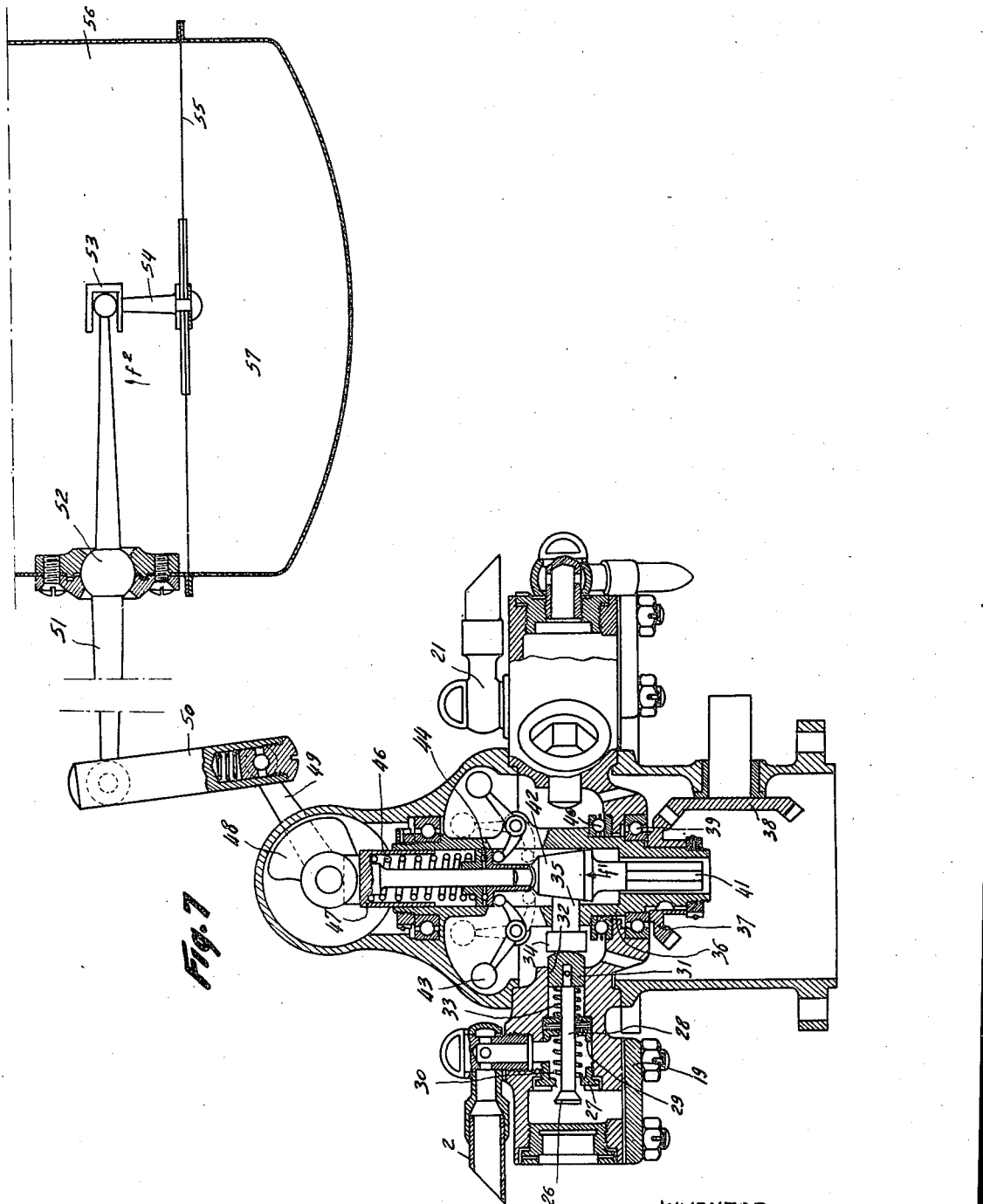
INVENTOR.
Marin André Lauret
Warren T. Hunt
ATTORNEY.

Patented Mar. 17, 1936

2,034,144

UNITED STATES PATENT OFFICE 2,034,144

SYSTEM FOR CHARGING INTERNAL COMBUSTION ENGINES

Marin André Lauret, Neuilly-sur-Seine, France, assignor to Bendix Aviation Corporation, South Bend, Ind., a corporation of Delaware Application October 5, 1932, Serial No. 636,421
In France March 8, 1932

9 Claims. (Cl. 123—139)

This invention relates to a system for charging the cylinders of internal combustion engines but more particularly to a system whereby air and fuel are separately introduced thereto.

The difficulties inherent in carburetion are well known, these difficulties being particularly apparent with respect to aviation motors. Among the ends to be desired are: a correct mixture at every speed, temperature and altitude; proper functioning in every conceivable position, and no matter what the pressure of the air admitted to the carburettor may be, an absolutely gasolene-tight apparatus which does not backfire, light weight and minimum dimensions.

It has been proposed to distribute the gasolene directly into each cylinder using the pumps and injectors employed on Diesel motors, but these devices do not function properly with gasolene and cannot provide the variations of delivery that are required for internal combustion motors.

The object of the present invention is to provide a system for feeding carburant to internal combustion engines permitting the injection into each cylinder close to each valve, either ahead or behind thereof, of a volume of gasolene regulated according to the amount of air admitted to the motor.

This system is particularly noteworthy in that it comprises in combination a single distributor fed with carburant under pressure, injection apparatus fixed to the cylinders or their heads and conduits communicating individually each injector to the distributor.

For the purpose of a more clear understanding of the invention reference may be had to the accompanying drawings in which:

Fig. 1 is a view in side elevation showing the device of the invention associated with an internal combustion engine.

Fig. 2 is an end elevation of the assembly.

Fig. 3 is a plan view of the assembly.

Fig. 4 is a section of the motor head showing the disposition of the injector with respect to the valve.

Fig. 5 is a section through an injector.

Fig. 6 is a section at 6—6 on Figure 5.

Fig. 7 is a longitudinal section of the distributor for carburant under pressure together with its control.

Fig. 8 is a plan view of the distributor, certain portions being cut away for clarity.

As represented in Figures 1 to 3 the gasolene is furnished to a rotary distributor A under a constant pressure of, for example, ten kilograms per square centimeter.

This gasolene may be furnished by any suitable pump (not shown), using a pressure regulator to maintain a constant pressure if such is deemed to be necessary or desirable. The gasolene may likewise be provided from a small reservoir that is fed by a gasolene pump of the type generally employed on aviation motors and may be placed under pressure by air from the reservoir which provides pressure for the starter, brakes, shock absorbers etc.

In the latter case it is preferable to utilize a double reservoir of small capacity, one of the parts being charged with gasolene by means of the ordinary gasolene pump while the other part delivers gasolene to the distributor A under a pressure of ten kilograms per square centimeter. Independent conduits 2, 2', 2'', etc. conduct the fuel from the distributor A to each cylinder, either, as shown in Figure 3, into the manifold 4 through 3 or directly into the head 7 as at 6. The gasolene can also be atomized under the valve seat itself by grooves or holes appropriate.

In case of atomization a head or after the valve 5 an ordinary injector such as is utilized on Diesel engines may be utilized, or a simple device such as the one represented in Figures 5 and 6. In this device the gasolene arrives by the tube 2, passes through the holes 8 into the chamber 9 of the injector and passes out after lifting a valve 10 which is urged on its seat by a spring 11 and guided by a stem 12 and ribs 13. The spring 11 is weak and as a consequence when the distributor A forces the gasolene into the injector the valve 10 is lifted and a very fine conical spray of gasolene is injected into the current of air and further atomized by a deflector 14.

The air enters the cylinders from a manifold 15 which is of such section as to preclude undue air resistance and requires no heating and the entrance 16 into the manifold 15 is placed so as to secure the maximum air pressure. If a supercharger is utilized, it delivers the compressed air at 16 without any change in the general layout.

A throttle 17 positioned in the manifold 15 beyond the air entrance 16 is controlled by an element 18 and regulates the quantity of air admitted to the cylinders and consequently the power and speed of the motor.

The distributor A (Figures 7 and 8) comprises a circular member 19 in which is provided a circular chamber 20. The gasolene under pressure comes from 21 and penetrates through an adjustable passage into the circular chamber 20. The passage is regulated by a needle valve 23 controlled by a cam 24 adapted to be motivated by a lever 25. The chamber 20 communicates with the various tubes 2, 2', 2'', etc. which conduct the gasolene to the cylinders through the intermediary of valves 26.

Each valve 26, constructed of stainless steel fits onto a seat 27 of hard bronze. The stem 28 of each valve 26 passes through a gland comprised of a special stuffing material pressed between two lead-bronze flanges by a rather strong spring 30. The end of the stem 28 carries a head 31 adapted to slide in a bore 32 of the member 19 and a spring 33 normally maintains the valve closed. Opening of the valves is effected by a tappet 34 comprising a stem 35 adapted to slide in an opening in a distributing rotor 36. This rotor is turned at half the speed of the crank shaft of the motor by means of two gears 38 and 39 actuated by the crank or cam shaft (not shown) and is mounted on ball and thrust bearings. Within the rotor 36 and co-axially therewith is provided a splined spindle 41 which is constrained to rotate with the rotor 36. This spindle carries a conical portion 42 which, when it moves longitudinally, operates to more or less vary the position of the tail of the cam 34 and increase, as a consequence, the height that the heads 31 and stems 28 will be raised. This has for effect to increase the lift of valves 26 and also the duration of opening.

The axial displacement of the cone 42 is controlled by a centrifugal device 43 fixed to the rotor 36. A thrust bearing 44 which controls the displacement of the spindle 41 under the action of the device 43 is opposed by a spring 46 whose tension may be varied. The other end of the spring 46 bears against a member 47 controlled by a cam 48 operated by a lever 49. This lever is attached by a link 50 to a lever 51 which is pivoted as at 52. The end of the lever is engaged by a member 53 carried by a stem 54 fixed to a diaphragm 55 separating two chambers 56 and 57. The upper chamber 56 communicates with the air manifold 15 while the lower chamber 57 is sealed and contains air at the pressure existing at the earth's surface.

The operation is the following: gasolene which enters the circular groove 20 is successively distributed to the different conduits 2, 2', 2'' etc. by the valves 26 lifted successively by the cam 34 rotated by the rotor 36. The extent that the valves are lifted off their seats is controlled by the longitudinal position of the cone 42.

Without the centrifugal device the distributor A would deliver to each cylinder a quantity of gasolene inversely proportional to the speed of rotation since the duration of opening of each valve of the distributor is itself inversely proportional to the speed of rotation but it can be seen that, with the centrifugal device, in proportion as the rotor speed increases, the device draws the spindle 41 against the pressure of spring 46 and changes the relation between the stems 35 and the cone 42 increasing thereby the lift of the valves and the duration of opening and consequently the delivery of gasolene.

Due to the centrifugal device which increases the duration of opening and the lift of the valves 26 as the speed of the motor increases, the volume of gasolene delivered to each cylinder is in constant ratio to every air admission whatever the speed may be. This is the condition which ought to be fulfilled by a motor turning at full speed and functioning properly, which is true of the device described since the intake manifold which is not heated is used only to assure maximum supply.

The actual speed of the engine must be controlled as in the case with all internal combustion engines operating without an automatic governor, by correct manipulation of the throttle valve.

When the throttle is closed the vacuum in the manifold 15 increases and this vacuum acts on the diaphragm 55 according to the difference of pressure in chambers 56 and 57. Therefore as the throttle is closed or as altitude is attained the density of the air and its pressure in 56 diminishes and the member 55 is displaced in the direction of the arrow $f^2$ (Fig. 7) causing movement through the member 53 of the lever 51. This lever, through the link 50 controls the lever 49 which compresses the spring 46 and consequently changes the position of the cone 42 for a given speed of the rotor 36.

As a result the delivery of the distributor diminishes in proportion as the density of the air drawn in diminishes, thereby giving a correct carburation for all variations of density or pressure in the manifold 15 no matter whether these variations result from closure of the throttle 17 (Fig. 1) or change in altitude. The needle valve 23 may be manually adjusted if necessary to correct for differences in temperature, in the nature of the combustible etc.

Obviously the invention is not to be limited to the specific embodiments illustrated and described herein but only as defined by the scope of the claims forming a part of this specification.

What I claim is:

1. In a device for charging the cylinders of an internal combustion engine having a manifold, a fuel distributor, separate conduits connecting the distributor to each cylinder, an air manifold, valves in the distributor adapted to control the admission of fuel to the conduits, means rotated by the engine to successively effect operation of the valves and increase the amount of valve opening as the speed is increased, and a device responsive to the differential between manifold pressure and a predetermined pressure for controlling the valve operating means in a manner to decrease the amount of valve opening as the manifold pressure is decreased.

2. In a device for charging the cylinders of an internal combustion engine having a manifold, a fuel distributor, conduits connecting the distributor to each cylinder, valves closing the conduits, means designed to successively open the valves and centrifugal means responsive to engine speed for controlling the valve opening means to increase the valve opening as the speed is increased and means responsive to the pressure in the manifold designed to modify the action of said centrifugal means according to the altitude in a manner to decrease the valve opening as the manifold pressure is decreased.

3. In a device for charging the cylinders of an internal combustion engine having a manifold, a fuel distributor, conduits associating the distributor and each cylinder, valves closing the conduits, rotary means including a tapered cam to successively open said valves, centrifugal means driven by the engine designed to move said cam to increase the valve opening as the engine speed is increased and means responsive to the manifold pressure opposing said centrifugal means and tending to decrease the valve opening when the manifold pressure is decreased.

4. In a device for charging the cylinders of an internal combustion engine from a supply of fuel under constant pressure, poppet valves for controlling the flow of fuel from the supply to the engine cylinders, means driven in timed relation to the engine for opening said valves, and means coacting with the engine driven means for increasing the opening of said valves as the engine speed increases.

5. In a device for charging the cylinders of an internal combustion engine having a manifold from a supply of fuel under constant pressure, poppet valves for controlling the flow of fuel from the supply to the engine cylinders, a tapered cam driven in timed relation to the engine for opening said valves, said cam being movable to vary the valve opening, and means including centrifugal weights for moving said cam and increasing the opening as the engine speed is increased.

6. In a device for charging the cylinders of an internal combustion engine having a manifold from a supply of fuel under constant pressure, poppet valves for controlling the flow of fuel from the supply to the engine cylinders, a tapered cam driven in timed relation to the engine for opening said valves, said cam being axially movable to vary the valve opening, resilient means urging the cam to a low opening position, means actuated by engine manifold pressure for increasing the force of the resilient means as manifold pressure is decreased, and means responsive to increase of engine speed for urging the cam to an increased opening position against the tension of the spring.

7. In a device for charging the cylinders of an internal combustion engine from a supply of fuel under constant pressure, tapered valves having a variable opening for controlling fuel flow from the supply to the cylinders, an engine driven tapered cam contacting the valves for actuating the same, said cam being axially movable to vary the valve opening, engine driven centrifugal weights arranged to urge the cam to an increased opening position as engine speed is increased, a spring opposing movement of said cam toward an increased opening position, and means actuated by the differential between manifold pressure and a predetermined pressure for increasing the tension of the spring when the manifold pressure is decreased.

8. In a device for charging the cylinders of an internal combustion engine having a manifold, a distributor for the fuel including valves adapted to open fuel orifices directly to the engine cylinders for a predetermined portion of an engine cycle, and means for increasing valve movement to increase the effective opening of the fuel orifices and increase the rate of fuel flow in accordance with increased engine speed.

9. In a device for charging the cylinders of an internal combustion engine having a manifold, a distributor for the fuel including valves adapted to open fuel orifices directly to the engine cylinders for a predetermined portion of an engine cycle, means for varying the movement of each valve respectively to vary the fuel orifice and control fuel flow rate, and means responsive to both engine manifold pressure and engine speed for controlling valve movement in a manner to increase the flow rate of fuel as engine speed is increased and to decrease the flow rate as the manifold pressure is decreased.

MARIN ANDRÉ LAURET.